(12) United States Patent
Nakahama et al.

(10) Patent No.: US 10,597,618 B2
(45) Date of Patent: Mar. 24, 2020

(54) METHOD FOR PRODUCING BEVERAGE HAVING BEER TASTE USING HOP BRACT

(71) Applicant: Suntory Holdings Limited, Osaka-shi, Osaka (JP)

(72) Inventors: Tomoyuki Nakahama, Osaka (JP); Takako Inui, Ibaraki (JP); Daisaku Yonezawa, Osaka (JP)

(73) Assignee: SUNTORY HOLDINGS LIMITED, Osaka-shi (JP)

( * ) Notice: Subject to any disclaimer, the term of this patent is extended or adjusted under 35 U.S.C. 154(b) by 571 days.

(21) Appl. No.: 14/779,390

(22) PCT Filed: Feb. 26, 2014

(86) PCT No.: PCT/JP2014/054745
§ 371 (c)(1),
(2) Date: Sep. 23, 2015

(87) PCT Pub. No.: WO2014/156450
PCT Pub. Date: Oct. 2, 2014

(65) Prior Publication Data
US 2016/0053210 A1 Feb. 25, 2016

(30) Foreign Application Priority Data
Mar. 28, 2013 (JP) ................................. 2013-068009

(51) Int. Cl.
*C12C 3/00* (2006.01)
*A23L 2/56* (2006.01)
(Continued)

(52) U.S. Cl.
CPC ............... *C12C 3/00* (2013.01); *A23L 2/382* (2013.01); *A23L 2/56* (2013.01); *C12C 5/02* (2013.01);
(Continued)

(58) Field of Classification Search
CPC .. C12C 3/00; C12C 11/00; C12C 5/02; C12C 7/205; C12G 3/06; A23L 2/382
See application file for complete search history.

(56) References Cited

U.S. PATENT DOCUMENTS 3,044,879 A * 7/1962 Kissel ....................... C12C 3/00
426/16
5,120,557 A * 6/1992 Owades .................... A23L 2/38
426/330.3
(Continued)

FOREIGN PATENT DOCUMENTS

CA 2829907 * 10/2012 ............... C12G 3/04
EP 1 854 446 A1 11/2007
(Continued)

OTHER PUBLICATIONS

Global Hops.com http://www.globalhops.com/PDF's/hallertauer.pdf Oct. 1, 2002 https://web.archive.org/web/20111226073550/http://www.globalhops.com/PDF's/hallertauer.pdf 2011 web capture.*
(Continued)

*Primary Examiner* — Felicia C Turner
(74) *Attorney, Agent, or Firm* — Westerman, Hattori, Daniels & Adrian, LLP

(57) ABSTRACT

A method for producing a beer-taste beverage, characterized in that the method includes adding a hop bract-containing composition having an α-acid content of less than 1% by weight of the composition in the step of producing a beer-taste beverage. According to the present invention, by the use of the hop bracts, it is possible to realize a balance between the bitterness, aroma derived from hops, and taste that cannot be achieved by a conventional production method. By appropriately adjusting the timing of adding hop bracts, beer-taste beverages having preferred features and strength of the aroma and controlled taste can be provided.

7 Claims, 6 Drawing Sheets

(51) Int. Cl.
*A23L 2/38* (2006.01)
*C12G 3/06* (2006.01)
*C12C 7/20* (2006.01)
*C12C 5/02* (2006.01)
*C12C 11/00* (2006.01)

(52) U.S. Cl.
CPC .............. *C12C 7/205* (2013.01); *C12C 11/00* (2013.01); *C12G 3/06* (2013.01)

(56) References Cited

U.S. PATENT DOCUMENTS

| | | | |
|---|---|---|---|
| 5,783,235 A | 7/1998 | Ting et al. | |
| 5,972,411 A * | 10/1999 | Goldstein | C12C 3/08 426/600 |
| 2002/0110619 A1 | 8/2002 | Rader et al. | |
| 2003/0185933 A1* | 10/2003 | Ting | C12C 3/08 426/11 |
| 2006/0251760 A1 | 11/2006 | Tagashira et al. | |
| 2007/0009619 A1 | 1/2007 | Yahiro et al. | |
| 2007/0254063 A1* | 11/2007 | Aerts | C12C 3/08 426/11 |
| 2013/0052320 A1* | 2/2013 | Umezawa | A23L 2/52 426/329 |
| 2013/0084359 A1* | 4/2013 | Covalt | C12G 3/02 426/16 |

FOREIGN PATENT DOCUMENTS

| | | |
|---|---|---|
| JP | 9-227 A | 1/1997 |
| JP | 9-163969 A | 6/1997 |
| JP | 2001-321166 A | 11/2001 |
| JP | 2005-152860 A | 6/2005 |
| JP | 2007-51096 A | 3/2007 |
| JP | 2007-89439 A | 4/2007 |
| JP | 2008-212041 A | 9/2008 |
| JP | 2010-98985 A | 5/2010 |
| JP | 2011-125291 A | 6/2011 |
| JP | 2012-105592 A | 6/2012 |
| WO | 2004/052898 A1 | 6/2004 |
| WO | 2005/032542 A1 | 4/2005 |
| WO | 2012/133758 A1 | 10/2012 |

OTHER PUBLICATIONS

RO 121526 Derwent abstract 2007.*
Kurokawa JP 2011-125291 7 pages Japanese Machine Translation (Year: 2011).*
Buciren (CN 101633872 Derwent Abstract) Jan. 27, 2010 (Year: 2010).*
A. Forster et al., "Untersuchungen zu Hopenfenpolyphenolen", Proc. 25th European Brewery Convention Congress, Brussels, Belgium, 1995, OIRL Press at Oxford University Press, Oxford, Jan. 1, 1995, pp. 143-150, with English Summary. Cited in the Extended (Supplementary) European Search Report dated Dec. 7, 2016.
Extended (Supplementary) European Search Report dated Dec. 7, 2016, issued in counterpart European Patent Application No. 14 77 6340.3. (10 pages).
Takako Inui, "The study of Hop Derived Aroma Compounds in Beer", Bio Indusry, Oct. 15, 2012, vol. 29, no11 pp. 23-30.
Linalool, "Fresh and Floral Hop Aroma", beer sensory science, Feb. 16, 2012, pp. 1-3.
International Search Report dated Jun. 3, 2014, issued in counterpart Application No. PCT/JP2014/054745. (1 page).
International Search Report dated Jun. 3, 2014, issued in counterpart application No. PCT/JP2014/054745 (4 pages).

* cited by examiner

FIG. 5 (Hallertauer Tradition)
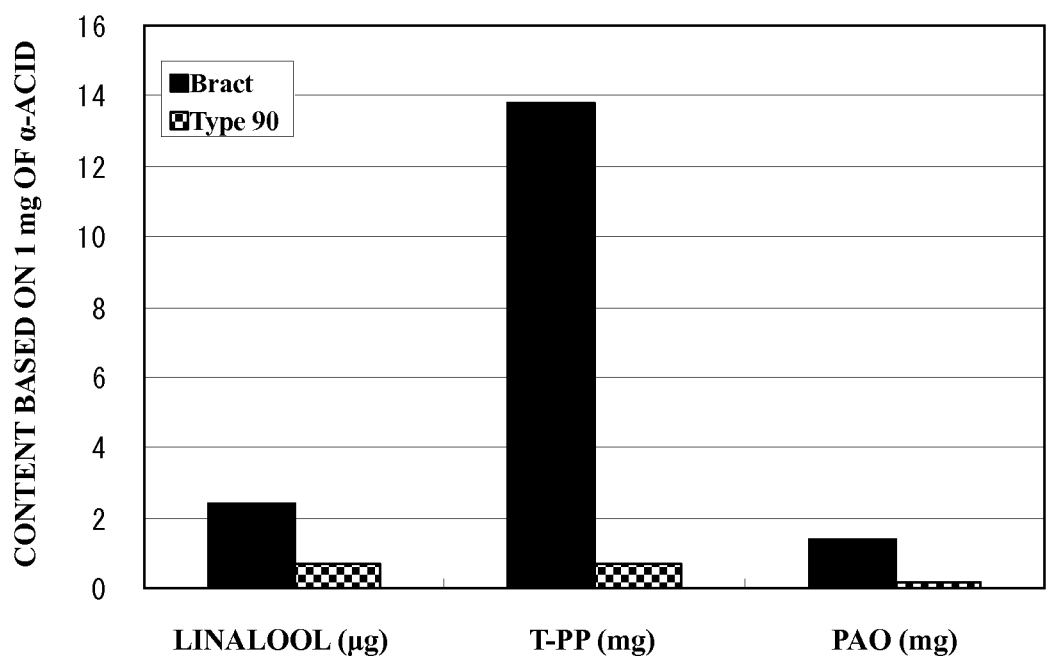
FIG. 6
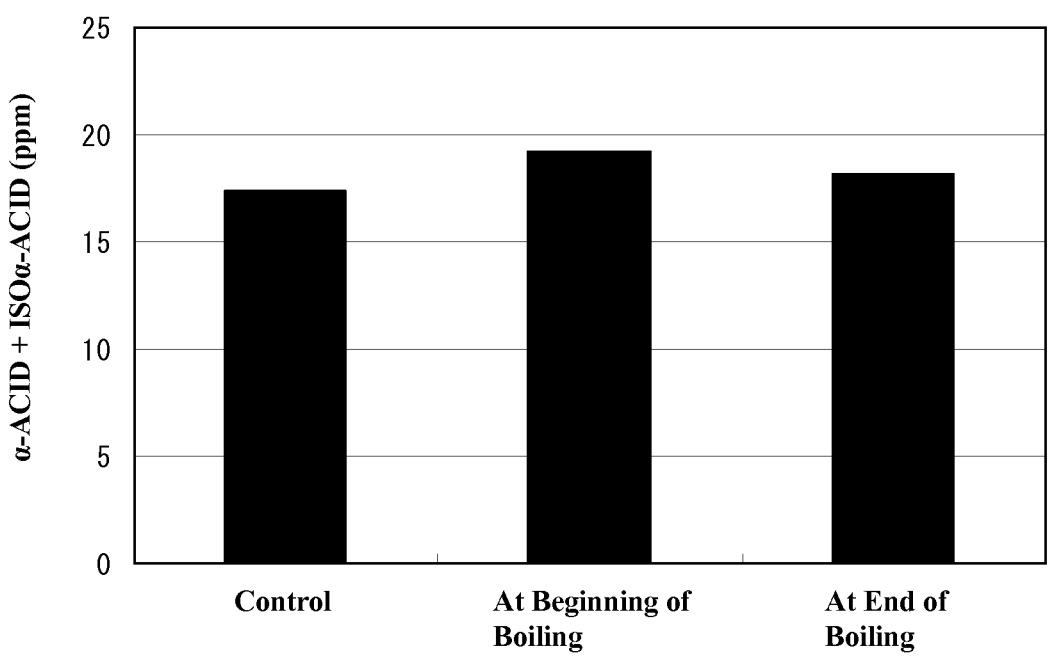

METHOD FOR PRODUCING BEVERAGE HAVING BEER TASTE USING HOP BRACT

TECHNICAL FIELD

The present invention relates to a method for producing a beer-taste beverage. More specifically, the present invention relates to a method for producing a beer-taste beverage using a hop bract, a method for adjusting flavor of a beer-taste beverage using the same hop bract, a hop bract-containing composition for use in these methods, and a beer-taste beverage obtained by the above methods.

BACKGROUND ART

In beer-taste beverages, raw materials such as malts and hops greatly affect their qualities. For example, hops not only give bitterness to beer-taste beverages but also give refreshing hoppy aroma and a body. Bitterness is attributable to an α-acid in the hops, hoppy aroma attributable to terpenes, and a body attributable to polyphenols, and the like, so that each of them is attributable to various ingredients. Accordingly, the bitterness, the hoppy aroma, and the body of the beer-taste beverages have been conventionally adjusted by selecting the methods of brewing, varieties to be used, and processed products depending upon the hops used.

As the selection of the methods of brewing, when hops are added to a wort boil, quality can be controlled by adding the hops at an initial stage, adding the hops in an intermediary stage, or adding the hops at a second-half of a wort boiling step or after a fermentation step. When added at an initial stage, an α-acid attributable to bitterness is sufficiently isomerized to form an iso-α-acid, so that high-quality bitterness can be extracted. On the other hand, a majority of the terpenes attributable to aroma would evaporate away. When added at a second-half stage, the terpenes attributable to aroma would remain, surely giving a hoppy aroma; however, on the other hand, isomerization of an α-acid would be insufficient, so that the bitterness may possibly not harmonize with the beer. In addition, other methods include dry hopping in which hops are dipped in a fermented and stored liquor. In the case of dry hopping, a fresh aroma distinctively owned by raw hops is given.

As the varieties to be used, hops are roughly classified into bitter varieties having a high α-acid content mainly purposed in giving bitterness, and aroma varieties giving high-quality aroma, and varieties of over 100 are being cultivated in the global markets. By selecting varieties having diversified qualities on these bitterness, aroma and body, a desired beer-taste beverage can be produced.

Here, a hop is a perennial plant belonging to Cannabaceae, and a hop flower thereof (matured non-pollinated pistillate flower) is generally referred to as a hop. The lupulin part of this hop flower (yellow granule) is considered to be a substantial part of the bitterness and aroma of the hop.

In beer-taste beverages, hop processed products having a variety of properties obtained by various processing methods have been used. For example, the hop processed products include "Dry Hop Flowers" in which hops are simply dried; "Hop Pellets Type 90" in which Dry Hop Flowers are pulverized and pelletized; "Hop Pellets Type 45" in which Dry Hop Flowers are lyophilized and pulverized, and a fractionated lupulin fraction is concentrated to form into pellets; and "Hop Extract" in which Hop Pellets Type 90 are subjected to a $CO_2$ extraction to extract bitterness ingredients. Further, as processed products having high degree of purity, as the aroma giving, "Oil-Rich Extract" in which hop pellets are subjected to an ethanol extraction to extract aroma ingredients can be used; as the body giving, "Polyphenol-Rich Pellets" which are by-products discharged during the production of hop extracts, and "Polyphenol-Rich Extract" obtained by concentrating only the polyphenol fraction from Polyphenol-Rich Pellets, and the like can be used. Here, "Type 90" and "Type 45" means that the respective yields are 90% or so, and 45% or so.

On the other hand, the hop bract which is a bract fraction discharged as a by-product during the production of Hop Pellets Type 45 have been usually used as fertilizers for soil improvement and feeds for livestock. In addition, as the techniques using this hop bract, Patent Document 1 discloses that a polyphenol derived from hop bracts has anti-oxidant action or bubble stabilizing action, anti-corrosive action, deodorant action, action for suppressive metastasis of cancer cells, and topoisomerase inhibiting action, so that polyphenols having high purity are produced from hop bracts, and blended with foodstuff, cosmetics, medicaments, and the like. Patent Publication 2 discloses hop bract tea obtained by roasting hop bracts or a beverage obtained by extracting hop bracts themselves, with hot water or water.

RELATED ART REFERENCES

Patent Publications

Patent Publication 1: WO2004-52898
Patent Publication 2: Japanese Patent Laid-Open No. Hei-09-227

SUMMARY OF THE INVENTION

Problems to be Solved by the Invention

In order to give taste and aroma derived from hops to a beer-taste beverage, it is general to use Hop Pellets Type 90, Type 45, and the like, but the increase in bitter taste also is generated along with giving taste and aroma upon their uses. On the other hand, when "Oil-Rich Extract," "Polyphenol-Rich Extract," or the like is used, although the bitterness does not increase, it is a processed product with a high degree of purity, so that there are some disadvantages that extraction procedures are complicated, the processing costs are expensive, or the limitation of manufactured article indications is generated in Japan, making it disadvantageous in the application to beer-taste beverages.

An object of the present invention is to provide a method for producing a desired beer quality with excellent productivity by giving body or aroma derived from hops, while suppressing the bitterness in the beer-taste beverage.

Means to Solve the Problems

In view of the above, as a result of the intensive studies in order to solve the problems, the present inventors have found that a desired beer quality can be produced with high accuracy, while suppressing the giving of bitterness, and allowing to give a body and aroma derived from hops to adjust their amount, by using hop bracts which have been hardly used in the conventional beer-taste beverages. The present invention has been perfected thereby.

Specifically, the present invention relates to the following [1] to [5]:
[1] a method for producing a beer-taste beverage characterized in that the method includes adding a hop bract-containing composition having an α-acid content of less than 1% by weight of the composition in the step of producing a beer-taste beverage;

[2] a method for adjusting flavor of a beer-taste beverage, characterized by the use of hop pellets of which α-acid content is less than 1% by weight;

[3] a beer-taste beverage produced by a method as defined in the above [1];

[4] a hop bract-containing composition having an α-acid content of less than 1% by weight of the composition, for use in a method as defined in the above [1] or [2]; and

[5] a beer-taste beverage, wherein a ratio of a content of linalool to a total content of an α-acid and isoα-acid, i.e. linalool/(α-acid+isoα-acid) is $4.2\times10^{-4}$ or more, and a ratio of a content of a total polyphenol to a total content of an α-acid and isoα-acid, i.e. total polyphenol/(α-acid+isoα-acid) is 4.1 or more, or a ratio of a total content of a dimeric proanthocyanidin and a trimeric proanthocyanidin to a total content of an α-acid and isoα-acid, i.e. (dimeric proanthocyanidin+trimeric proanthocyanidin)/(α-acid+isoα-acid) is 0.32 or more.

Effects of the Invention

According to the method for production of the present invention, it is possible to give a body or aroma without marked increase in bitterness, thereby making it possible to accurately produce a desired beer-taste beverage. Also, the hop bracts used in the method for production of the present invention are generally more easily available without complicated production steps, as compared to Oil-Rich Extract, Polyphenol-Rich Extract or the like, so that the method for production of the present invention has excellent productivity.

BRIEF DESCRIPTION OF THE DRAWINGS

FIG. 5 is a graph showing the results of comparing the contents of each ingredient in the hop bracts and the hop processed products for the Hallertauer Tradition hop.

FIG. 6 is a graph showing the results of bitterness ingredient analysis of the beers of Examples.

MODES FOR CARRYING OUT THE INVENTION

Figure 1:
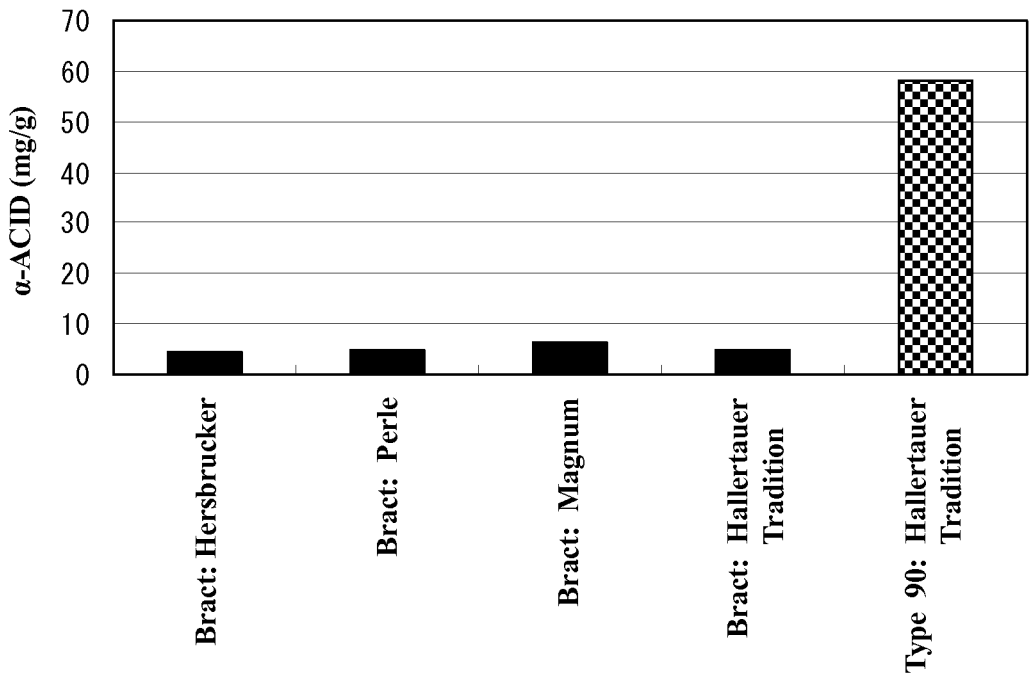
FIG. 1 is a graph showing the α-acid content in the hop bracts and the hop processed products.

The method for producing a beer-taste beverage of the present invention is characterized in that the method includes adding a hop bract-containing composition having an α-acid content of less than 1% by weight of the composition (which may be hereinafter referred to as a hop bract-containing composition of the present invention) in the step of producing a beer-taste beverage. In other words, the present inventors have found for the first time in the present invention that when the aroma ingredient and the ingredient concerning body or the like (hereinafter referred to as body ingredient) are converted to an amount based on the bitterness ingredient in the hop bracts, both the aroma ingredient and the body ingredient are contained in larger amounts than those of other hop processed products. The present invention has a great feature in that a hop bract-containing composition of the present invention is added so as to give an intended beer-taste using the hop bracts having the above quality.

The production steps for the beer-taste beverage are not particularly limited, so long as the steps are included in a known method for producing a beer-taste beverage, details of which are given later. Here, the hop bract-containing composition in the present invention is not particularly limited, so long as the α-acid content in the composition is less than 1% by weight, and includes hops themselves of which α-acid content is less than 1% by weight (for example, dry hop flower) as one embodiment.

The term "beer-taste beverage" as referred to herein refers to a carbonated beverage having a beer-like taste. In other words, unless specified otherwise, the beer-taste beverage of the present specification embraces all the carbonated beverages having beer taste, regardless of the presence or absence of a fermentation step with an yeast. Specific examples include beers, Happoushu (low-malt beers), other miscellaneous liquors, liqueurs, nonalcoholic beverages and the like.

The methods of finding out the features of the hop bracts will be explained hereinbelow.

The hops in the present invention are not particularly limited in the areas of produce and varieties, and known aroma hops, bitter hops, and the like may be used. Specifically, aroma hops are exemplified by Hallertauer Mittelfrueh, Hallertauer Tradition, Hersbrucker, Perle, Tettnanger, Cascade, Saaz, Sladek and the like; and bitter hops are exemplified by Northern Brewer, Herkules, Magnum, Nugget, Taurus, Galaxy, Target and the like.

As the hops used in the production of beer, a hop flower part constituted by lupulin containing a resin and a purified oil, and bracts (hop bracts) containing a phenol (tannin) is mainly used. Here, the bracts refer to flower petal-like tissues outside of the hop flower, and on the other hand, the lupulin refers to yellow granules that are present at the bottom stem of the bracts. The resin ingredient contains, in addition to an α-acid, which is a bitterness ingredient, primarily a β-acid, and the purified oil ingredient contains a terpene. More specifically, the terpene includes monoterpenes which are considered to be attributable to splendid aroma (as in flowers and the like), and sesquiterpenes which are considered to be attributable to mild aroma (as in bark and the like). The monoterpenes include myrcene, linalool, geraniol, limonene, and the like, and the sesquiterpenes include caryophyllene, humulene, farnesen, and the like. In addition, the phenolic ingredient includes hydroxybenzoic acid, hydroxycinnamic acid, proanthocyanidins, flavonoids, and polymers thereof. Among them, those having plural phenolic hydroxyl groups in one molecule are collectively referred to as polyphenols, which are considered to be attributable to a body. Among them, the dimeric proanthocyanidin and the trimeric proanthocyanidin are considered to be especially attributable to a body.

On the other hand, since there were findings only as far as that the total polyphenol content for the hop bracts is high, first, in order to confirm the quality owned by the hop bracts, a fraction obtained by removing lupulin from the hop flower generated during the production of Hop Pellets Type 45 as hop bracts will be analyzed. Concretely, the content of each of the α-acid, which is the ingredient originating bitterness, a terpene (linalool), which is a hoppy aroma ingredient, a total polyphenol (hereinafter also referred herein as "T-PP"), and a dimeric proanthocyanidin and a trimeric proanthocyanidin (collectively referred to herein as "PAO"), which are body ingredients, in the hop bracts is measured. Here, the total polyphenol refers to a polyphenol measured as prescribed in the EBC method, which includes various polyphenols besides the PAO.

The content of each ingredient can be measured using a known method depending upon the properties of the ingredients. The content of each ingredient of the hop bract-containing composition is measured after the extraction procedure of the method or the like described in Examples.

For example, the α-acid and the isoα-acid can be measured in accordance with Method 7.7 of "Analytica-EBC" prescribing the analytical method published by the EBC (European Brewery Convention). In the present specification, the measurements can be made in accordance with the method described in Examples set forth below.

Linalool, which is a terpene, can be measured in accordance with "ASBC Methods of Analysis" prescribing the analytical method published by ASBC (The American Society of Brewing Chemists). In the present specification, the linalool can be measured in accordance with the method described in Examples set forth below.

The total polyphenol can be measured in accordance with Method 9.11 of "Analytica-EBC" prescribing the analytical method published by the EBC (European Brewery Convention). In addition, the PAO can be measured in accordance with a method described in Examples set forth below, for example, in accordance with an HPLC method.

Next, as to the varieties that are the same as the varieties for which ingredient contents of the hop bracts are analyzed, the ingredient contents in the hop processed products having different contents of bracts, for example, Hop Pellets Type 90 (also referred to Pellets Type 90, and Hop Pellets Type 45 are also referred to as Pellets Type 45) are measured in the same manner as above. Here, the bract content in Pellets Type 90 is from 95 to 99.5% by weight or so, and the bract content in Pellets Type 45 is from 90 to 99% or so.

The contents of each ingredient thus obtained are compared for each of hop bracts and the hop processed products. For example, with respect to each ingredient such as a bitterness ingredient, an aroma ingredient, and a body ingredient, the shape of the hops is plotted as the axis of abscissas against the contents thereof as the axis of ordinates, thereby making it possible to grasp the features of the hop bracts.

In the comparisons, although the absolute amount of the ingredients can be directly compared, the comparison may be made by converting to other ingredient content based on one component, for example, a linalool content, a T-PP content, and a PAO content (total content of dimeric proanthocyanidin and trimeric proanthocyanidin) may be calculated per 1 mg of α-acid, and compared. In addition, the above-mentioned content can be described as the content (parts by weight) based on 100 parts by weight of the α-acid.

For example, as to Hallertauer Tradition hop, the present inventors report that the following tendencies are found by carrying out the comparisons between the hop bract parts and Pellets Type 90 in accordance with the method mentioned above.

<Tendencies of Hop Bracts (Comparison with Pellets Type 90)>

α-Acid: An absolute amount thereof is very small as compared to that of Pellets Type 90.

Terpene: Although an absolute amount thereof is smaller than Pellets Type 90, when the contents based on the α-acid content are compared, the content is about 4 times as much.

Total Polyphenol, PAO: Both are nearly the same levels in the absolute amount as Pellets Type 90, and contained in a very large amount when compared to the content based on the α-acid content.

In addition, each ingredient in the hop bract parts is very small as compared to usual hop processed product, so that the following tendencies can be seen from an absolute content thereof <Tendencies of Hop Bracts>

Terpene: The content is preferably 0.12 parts by weight or more, and more preferably 0.24 parts by weight or more, based on 100 parts by weight of the α-acid, and, for example, the content is preferably 1.2 ng or more, and more preferably 2.4 ng or more, based on 1 mg of the α-acid.

Total Polyphenol: The content is preferably 410 parts by weight or more, and more preferably 1,380 parts by weight or more, based on 100 parts by weight of the α-acid, and, for example, the content is preferably 4.1 mg or more, and more preferably 13.8 mg or more, based on 1 mg of the α-acid.

PAO: The content is preferably 16 parts by weight or more, and more preferably 140 parts by weight or more, based on 100 parts by weight of the α-acid, and, for example, the content is preferably 0.16 mg or more, and more preferably 1.4 mg or more, based on 1 mg of the α-acid.

As described above, the hop bracts not only have a smaller α-acid content, but also have larger total polyphenol content and PAO content based on the α-acid content, and further contain a terpene which is conventionally considered to be present in the lupulin part in a large amount, so that it can be seen that it is possible that not only a body but also aroma is given. Also, since the qualities greatly differ from Pellets Type 90, in a case where a beer-taste beverage is given a body or aroma without increasing bitterness, it is suggested that the hop bracts are selected and used. In that case, the amount used may be selected once grasping the aroma ingredient and the body ingredient that are contained in the hop bracts without resorting to varieties. Accordingly, in the method for production of the present invention, the enhancement of the body and the aroma is made possible without increasing the amount of hops used based on the α-acid, by using a hop bract-containing composition containing lupulin as little as possible, in other words, having an α-acid content of less than 1% by weight. It is possible to produce a desired beer-taste beverage accurately by making it possible to give a body or aroma. In addition, since it is a by-product during the production of hop pellets such as Type 45, it is readily available, making it excellent in productivity.

In addition, in order to give a more remarkable body or aroma, the timing of adding a hop bract-containing composition in the production steps of the beer-taste beverage may be adjusted. For example, a hop bract-containing composition is added in a second-half of the boiling step (including the end of boiling), and/or steps after the boiling step, whereby a beer-taste beverage having an even richer taste, or a beer-taste beverage being rich in splendid aroma can be made. In addition, by adding the composition to a first-half of the boiling step, the taste can be richly given without markedly giving aroma of the hops. Here, the amount of the hop bract-containing composition is not unconditionally determined depending upon a desired body or aroma, and the amount of the composition is usually from 10 to 95% by weight of the entire amount of hops used in the production of the beer-taste beverage.

The hop bract-containing composition in the present invention is not particularly limited so long as the α-acid content is less than 1% by weight of the composition, and the composition can be prepared by, for example, selectively removing lupulin from the hop flowers. One example thereof is to produce as a by-product during the production of Pellets Type 45. In addition, a composition having an α-acid content of 1% by weight or more (for example, Pellets Type 90) is blended with a composition having an α-acid content of less than 1% by weight (for example, hop bracts) to give a composition of which α-acid content is less than 1% by weight in the blend, which may be used as a hop bract-containing composition in the present invention. In addition, a dry hop flower can be used directly. Here, the shape is not particularly limited, and the shape may be pellet-like.

In addition, in the present invention, in a case where a body, aroma, and bitterness are provided in a desired balance, used varieties and amounts may be adjusted once the ingredients of the hop bracts are grasped, so as to have desired bitterness ingredient content, aroma ingredient content, and body ingredient content to prepare a hop bract-containing composition.

Thus, it is made possible to give a body or aroma by using the hop bract-containing composition while minimizing the giving of bitterness to the beer-taste beverage.

In the method for producing a beer-taste beverage, hops are mainly added to a wort boil. A first purpose thereof is to isomerize α-acids attributable to bitterness, thereby providing bitterness adapted to a beer-taste beverage. Usually, in the quality design of a beer-taste beverage, the addition of the hops to a wort boil is carried out in one to three divided portions. For example, hops are added at an initial stage (early stage) of wort boiling, the isomerization of the α-acids sufficiently progresses to ensure the quality of bitterness, while little α-acids remaining in the hops, so that the losses of the α-acids by removal to the external of the system are minimized. In addition, the polyphenol attributable to taste is sufficiently extracted. On the other hand, since the terpene attributable to hoppy aroma evaporates, the hoppy aroma would not be sufficiently given. In addition, hops are added at a second-half of wort boiling or after the boiling step or fermentation step, whereby evaporation of the terpene is suppressed, so that a beer-taste beverage is given with hoppy aroma. Meanwhile, there are some concerns that the extraction of the polyphenol slightly lowers efficiency, and that the isomerization of the α-acids would be insufficient, so that it is assumed that the α-acids would remain in the manufactured article, whereby high-quality bitterness cannot be secured. Accordingly, each of the ingredients of a body, aroma, and bitterness can be adjusted to a desired content without resorting to the amount of hops used by using a hop bract-containing composition which makes it possible to give aroma ingredient and body ingredient, while suppressing from giving the α-acids. In addition, the hop bract-containing composition of the present invention contains an α-acid content in a very small amount as compared to ordinary hop process products such as Pellets Type 90 and Pellets Type 45, thereby making it possible to add at any timing, such as during wort boiling, at the beginning of fermentation, or at the end of fermentation.

The method for producing a beer-taste beverage of the present invention can be carried out in accordance with a conventional method which is known to one of ordinary skill in the art except for carrying out the step of adding a hop bract-containing composition as mentioned above. For example, raw materials other than at least one member selected from the group consisting of barleys such as malts, other grains, starches, and saccharides, such as bitterness seasonings and pigments, are optionally supplied to a charging pot or charging tank, an enzyme such as amylase is optionally added to carry out alpha-formation or saccharidization, and husks and the like are removed by filtration to give a wort, a hop bract-containing composition of the present invention is subsequently added to the wort obtained and boiled optionally together with a known hop (hop processed product), and solid contents such as coagulated proteins are removed in a clear tank to provide a clear wort. As the conditions in these saccharidizing step, boil-clearing step, solid content-removing step, and the like, known conditions may be used.

Next, in a case of an alcoholic beverage, the alcoholic beverage can be produced by adding an yeast to the clear wort obtained above to allow fermentation, and removing the yeast optionally with a filtration device or the like (also referred to as a fermentation step). As the fermentation conditions, known conditions may be used. In addition, the hop bract-containing composition of the present invention may be added after the beginning of fermentation. Alternatively, raw materials having alcohol contents such as Spirits may be added instead of going through the fermentation step. Further, an alcoholic beer-taste beverage can be obtained by adding a stored liquor and optionally a carbon dioxide gas thereto, and subjecting the mixture to steps of filtration, bottling in a vessel, and optionally sterilization.

On the other hand, in a case of a nonalcoholic beverage, the nonalcoholic beverage can be produced by, for example, subsequent to the above solid content-removing step, storing a clear wort obtained above as it is, adding a carbon dioxide gas thereto, and subjecting to the mixture steps of filtration, bottling in a vessel, and optionally sterilization, without going through the above fermentation step. Alternatively, a nonalcoholic beer-taste beverage can also be obtained by, subsequent to the fermentation step of the above alcoholic beverage, reducing an alcoholic concentration according to a known method such as beer film treatment or dilution. A preferred method for production is a method for production that goes through a fermentation step.

According to the present invention, it is made possible to highly accurately produce a desired beer-taste beverage. The beer-taste beverage obtained according to the present invention includes, for example, a beer-taste beverage having a ratio of a linalool content to a total content of the α-acid and the isoα-acid, i.e. linalool/(α-acid+isoα-acid), is $4.2 \times 10^{-4}$ or more, and a ratio of a total polyphenol content to a total content of the α-acid and the isoα-acid, i.e. total polyphenol/(α-acid+isoα-acid), is 4.1 or more, or a ratio of a total content of a dimeric proanthocyanidin and a trimeric proanthocyanidin to a total content of the α-acid and the isoα-acid, i.e. (dimeric proanthocyanidin+trimeric proanthocyanidin)/(α-acid+isoα-acid), is 0.32 or more.

Also, the present invention provides a method for adjusting flavor of a beer-taste beverage, characterized in that the method includes selecting and adding hop bract-containing composition suitable for an intended beer taste, because it is possible to give a body or aroma to a beer-taste beverage using hop bracts having desired ingredient contents as mentioned above. Here, the flavor (aroma and taste) includes mainly hoppy aroma and a body.

Specifically, it is made possible to make and develop a desired quality by selecting the timing of adding a hop bract-containing composition of the present invention. For example, the used ratio of the hop bract-containing composition of the present invention to be added in a second half of the wort boiling is adjusted to preferably 10% by weight or more, of the amount of the total hops added in the same timing, so that the hoppy aroma can be enhanced.

In the adjustment of a body, for example, the used ratio of the hop bract-containing composition of the present invention to be added in a first half of the wort boiling is adjusted to preferably 10% by weight or more, of the amount of the total hops added in the same timing, so that the body ingredient can be enhanced.

Thus, some excellent effects are exhibited that the quality of the beer-taste beverage can be highly accurately produced by properly adjusting the timing of adding the hop bract-containing composition of the present invention depending upon the desired qualities such as aroma ingredient and a body.

Furthermore, in the present invention, it is made possible to prepare a hop processed product rich in the desired ingredient by using the hop bracts having high contents of the aroma ingredient and the body ingredient, based on the bitterness ingredient. Accordingly, the present invention can provide a hop processed product having an α-acid content of less than 1% by weight.

The hop processed product is not particularly limited in its shape, so long as the processed product has an α-acid content of less than 1% by weight, preferably less than 0.75% by weight, and more preferably less than 0.5% by weight, and the hop processed product is usually processed into the shape of pellets.

The hop processed product of the present invention can be produced in accordance with a known method depending upon its shape, so long as the α-acid content falls within the above range. For example, the hop processed product can be produced as a by-product during the production of Pellets Type 45. Pellets Type 45 is produced by lyophilizing hop flowers, pulverizing and sieving the lyophilized product, concentrating a lupulin fraction, and pelletizing the concentrate, and during this process a part in which the bract tissues are present in a large amount can be pelletized, whereby the hop processed products of the present invention in pellet shapes (hop bract pellets) other than the lupulin fraction can be produced.

A desired beer-taste beverage can be highly accurately produced by using the above processed product, for example, by adding the processed product to the wort boil in the manner as described in the method for adjusting flavor of beer-taste beverage of the present invention.

EXAMPLES

The present invention will be specifically described hereinbelow by the Examples, without intending to limit the scope of the present invention to the following Examples.

Test Example 1

Content of Bitterness Ingredient in Hop Bracts

With respect to five kinds of hop bracts of different varieties, the α-acid content was quantified. Here, of the above varieties, the α-acid content was also quantified for one kind of hop processed product (Pellets Type 90). Specifically, 2.5 g of bracts or pellets were suspended in 20 mL of toluene, and the suspension was shaken for 30 minutes to carry out extraction. The supernatant was collected by centrifugal treatment, and 8 mL of the supernatant was dried with an evaporator. Twenty-five milliliters of methanol was added to the residue to dissolve, to give a hop ingredient extract. The obtained extract was analyzed in accordance with a method described in Method 7.7 prescribing the analytical method "Analytica-EBC" published by EBC (European Brewery Convention). The results are shown in Table 1 and FIG. 1. The results are expressed by the weight of α-acid based on the weight of the hop bracts or pellets.

TABLE 1

| Varieties | Shape | α-Acid Content (mg/g) |
| --- | --- | --- |
| Hersbrucker | Bracts | 4.4 |
| Perle | Bracts | 4.8 |
| Magnum | Bracts | 6.3 |
| Hallertauer Tradition | Bracts | 4.8 |
| Hallertauer Tradition | Pellets Type 90 | 57.9 |

It can be seen from Table 1 and FIG. 1 that the α-acid content of the hop bracts is less than 1% by weight, which is remarkably smaller than the conventional hop pellets.

Test Example 2

Content of Aroma Ingredient in Hop Bracts

Figure 2:
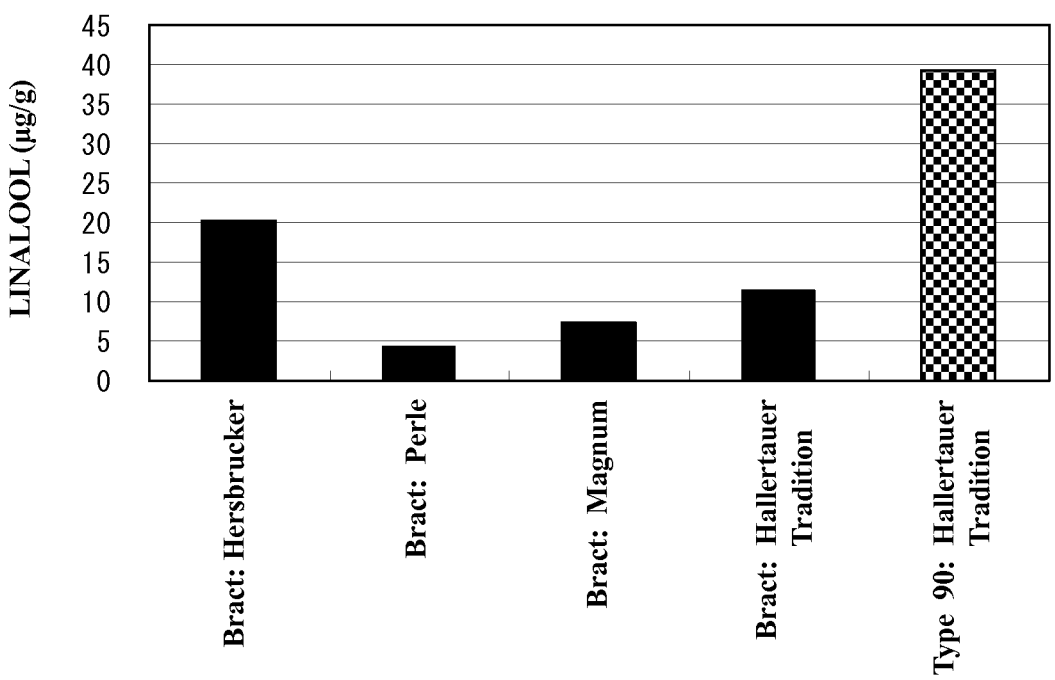
FIG. 2 is a graph showing the linalool content in the hop bracts and the hop processed products.

With respect to the hop bracts and the hop pellets of Test Example 1, the linalool content was measured as a hoppy aroma ingredient. Specifically, first, 0.08 g of the bracts or pellets were suspended in 40 mL of citrate buffer of which pH was adjusted to 5.30, and the suspension was subjected to a 10-minute treatment in an autoclave at 100° C., rapidly cooled, and filtered with a filter, to give a hop ingredient extract. The hop ingredient extract was quantified in accordance with "ASBC Methods of Analysis" prescribing the analytical method published by ASBC (The American Society of Brewing Chemists) with GC-MS under the following conditions. The results are shown in Table 2 and FIG. 2. The results are shown by the weight of linalool based on the weight of the hop bracts or hop pellets.

<GC-MS Conditions>
Capillary column: manufactured by J&W, DB-WAX (length: 60 m, inner diameter: 0.25 mm, membrane pressure: 0.5 μm)
Oven Temperature: heating from 40° to 240° C. at a rate of 6° C./minute, and holding for 20 minutes
Carrier Gas: He
Flow Rate of Gas: 1.5 mL/min
Transfer Line Temperature: 240° C.
MS Ion Source Temperature: 230° C.
MS Quadrupole Temperature: 150° C.
Front Injection Temperature: 240° C.

TABLE 2

| Varieties | Shape | Linalool Content (μg/g) |
| --- | --- | --- |
| Hersbrucker | Bracts | 20.3 |
| Perle | Bracts | 4.2 |

TABLE 2-continued

| Varieties | Shape | Linalool Content (μg/g) |
|---|---|---|
| Magnum | Bracts | 7.3 |
| Hallertauer Tradition | Bracts | 11.5 |
| Hallertauer Tradition | Pellets Type 90 | 39.2 |

It could be seen from Table 2 that the aroma ingredient (linalool) which is considered to be localized in the lupulin part is present in a fairly large amount in the hop bracts.

Test Example 3

Content 1 of Body Ingredient in Hop Bracts

With respect to the hop bracts and the hop pellets of Test Example 1, a total polyphenol (T-PP) which is a polyphenol was quantified as a body ingredient. Specifically, first, 0.08 g of the bracts or pellets were suspended in 40 mL of citrate buffer of which pH was adjusted to 5.30, and the suspension was subjected to a 10-minute treatment in an autoclave at 100° C., rapidly cooled, and filtered with a filter, to give a hop ingredient extract. The obtained extract was quantified in accordance with a method described in Method 9.11 prescribing the analytical method "Analytica-EBC" published by EBC (European Brewery Convention). The results are shown in Table 3 and FIG. 3. The results are shown by the weight of T-PP based on the weight of the hop bracts or hop pellets.

TABLE 3

| Varieties | Shape | T-PP Content (mg/g) |
|---|---|---|
| Hersbrucker | Bracts | 42.2 |
| Perle | Bracts | 48.6 |
| Magnum | Bracts | 25.6 |
| Hallertauer Tradition | Bracts | 66.4 |
| Hallertauer Tradition | Pellets Type 90 | 39.2 |

Figure 3:
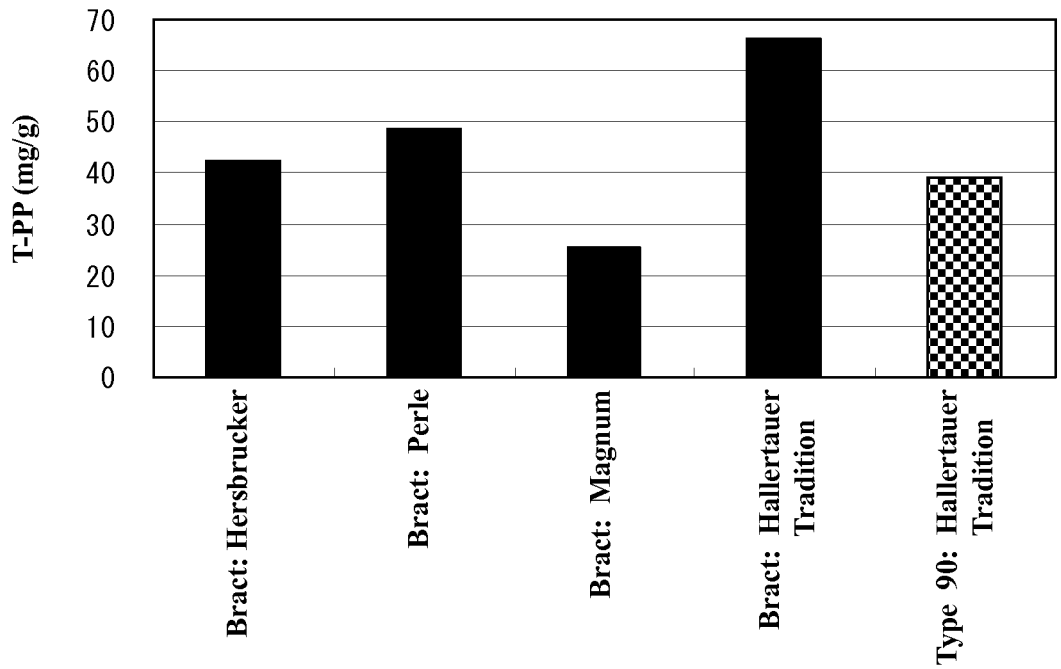
FIG. 3 is a graph showing the total polyphenol (T-PP) content in the hop bracts and the hop processed products.

It could be seen from Table 3 and FIG. 3 that the T-PP content was of the same level in both the hop bracts and the hop pellets.

Test Example 4

Content 2 of Body Ingredient in Hop Bracts

With respect to the hop bracts and the hop pellets shown in Table 4, dimeric proanthocyanidin and trimeric proanthocyanidin (PAO) which are polyphenols were quantified as body ingredients. Specifically, first, 20 g of bracts or pellets were stirred in 2 L of water, and extraction was carried out at 97° C. for 20 minutes, to obtain an extract (a polyphenol fraction). After filtration, the filtrate was allowed to cool in the air, and the cooled filtrate was concentrated at 30° C. under a reduced pressure up to a volume of 100 mL, and the concentrate was lyophilized to obtain a powder. The HPLC analysis was carried out using the powder obtained, under the conditions shown below. The results are shown in Table 4 and FIG. 4. The results are expressed by the weight of PAO based on the weight of the hop bracts or pellets.

<HPLC Conditions>
Apparatus: HEWLETT PACKARD SERIES 1100
Column: Inert Sil (GL Sciences Inc. SIL 100 A 3 μm, 4.6 mm×150 mm)
Flow Rate: 1.0 mL/min
Mobile Phase: Isocratic elution using a solution of hexane:methanol:tetrahydrofuran:formic acid=45/40/14/1
Amount of Sample Injection: 10 μL,
Detection: Detected at multi-wavelengths from 200 to 300 nm

TABLE 4

| Varieties | Shape | PAO Content (mg/g) |
|---|---|---|
| Hersbrucker | Bracts | 5.0 |
| Perle | Bracts | 4.5 |
| Magnum | Bracts | 1.0 |
| Hallertauer Tradition | Bracts | 6.7 |
| Hallertauer Tradition | Pellets Type 90 | 8.9 |

Figure 4:
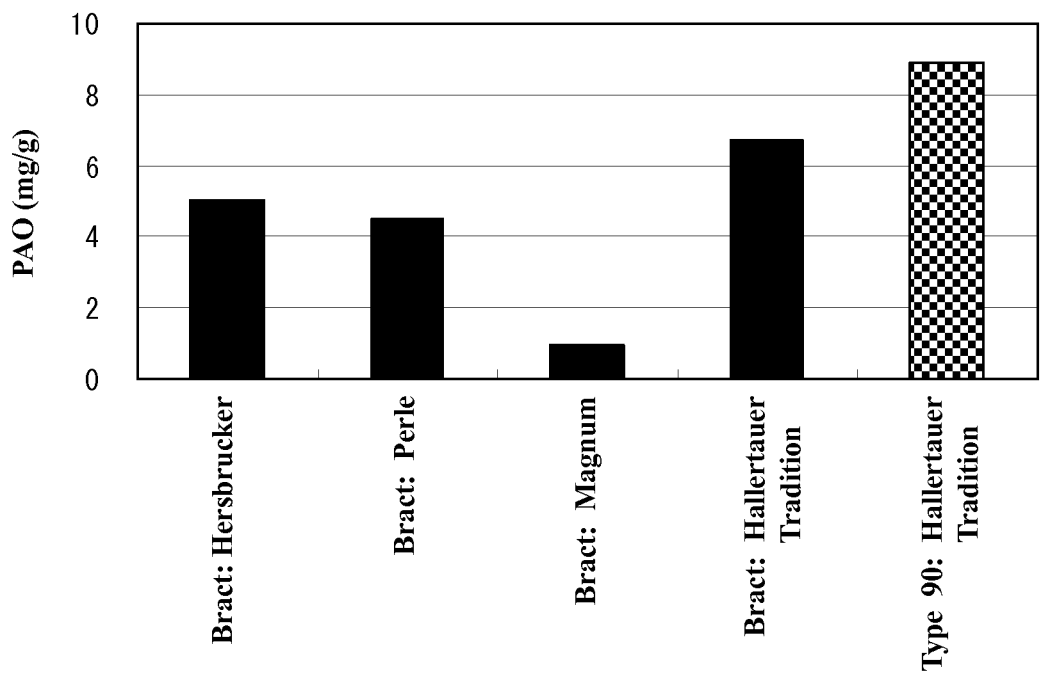
FIG. 4 is a graph showing the contents of dimeric proanthocyanidin and trimeric proanthocyanidin (PAO) in the hop bracts and the hop processed products.
Figure 7:
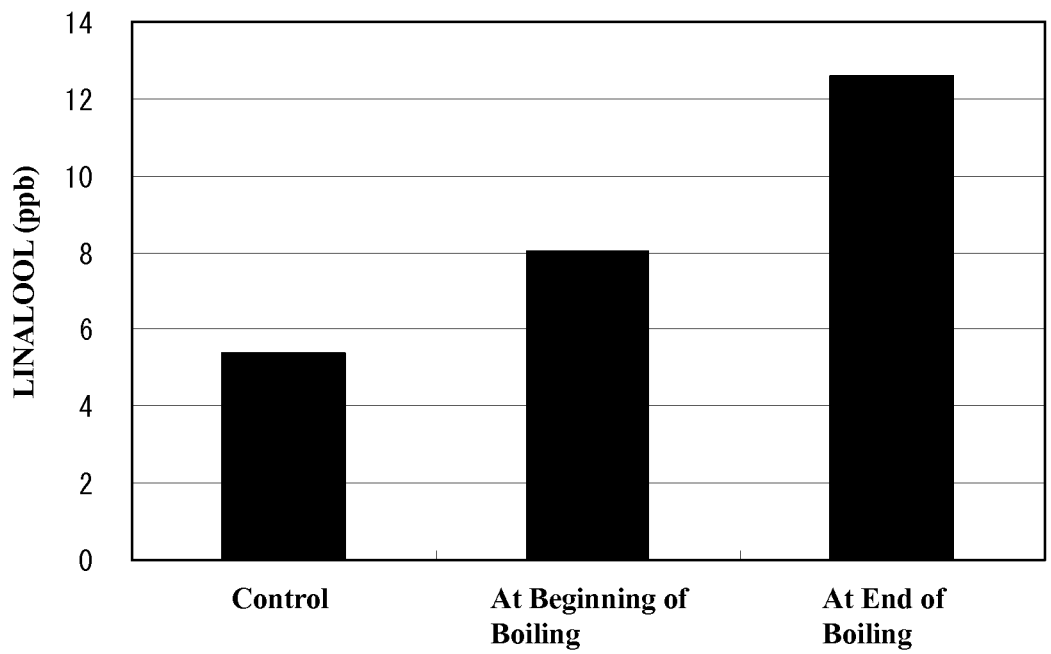
FIG. 7 is a graph showing the linalool content in the beers of Examples.
Figure 8:
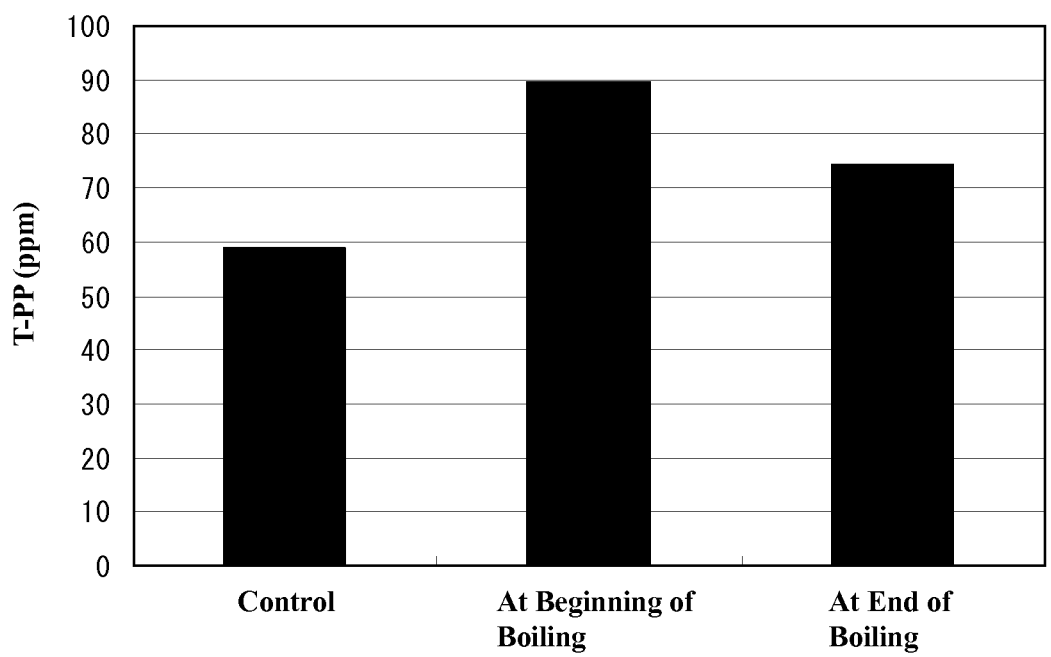
FIG. 8 is a graph showing the total polyphenol (T-PP) content in the beers of Examples.
Figure 9:
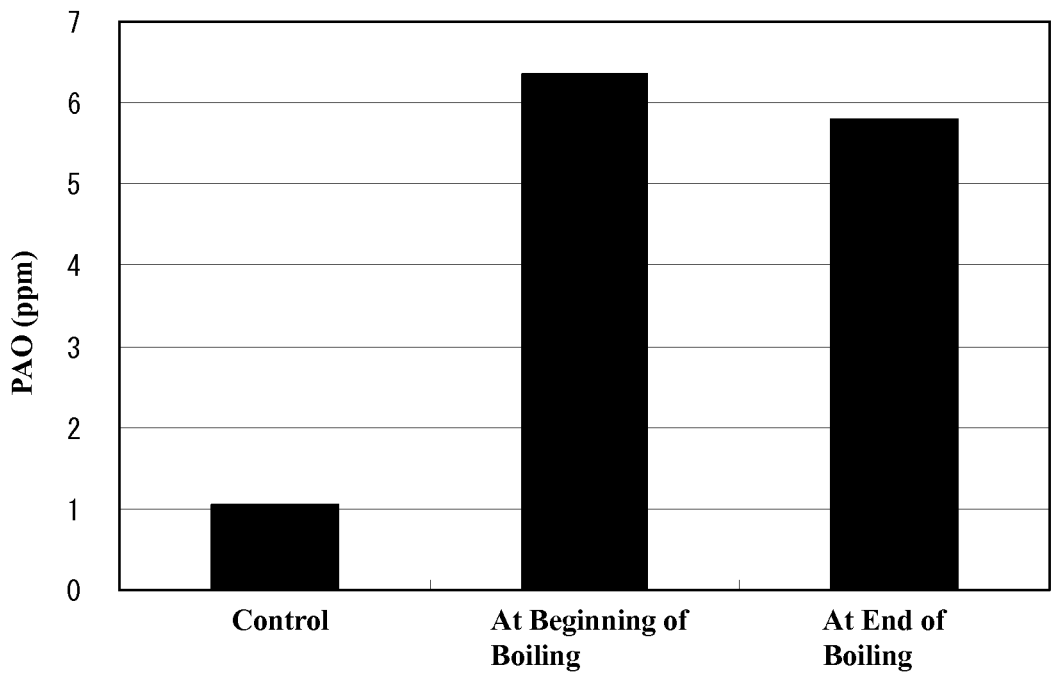
FIG. 9 is a graph showing the contents of dimeric proanthocyanidin and trimeric proanthocyanidin (PAO) in the beers of Examples.

It could be seen from Table 4 and FIG. 4 that the PAO content was of the same level in both hop bracts and hop pellets, showing similar tendencies to those of T-PP.

The present inventors have found out from Test Examples 1 to 4 that the hop bracts can be utilized in beer-taste beverages.

Test Example 5

Content of Each Ingredient Per 1 mg α-Acid in Hop Bracts or Processed Products

With respect to each ingredient of the various hops quantified in Test Examples 1 to 4 mentioned above, the content contained in a composition containing 1 mg of the α-acid (also referred to as "content based on 1 mg of the α-acid") was calculated to each of the bracts and Pellets Type 90. The results of Hallertauer Tradition are shown in Table 5 and FIG. 5, and the results of other varieties are shown in Table 6.

TABLE 5

< Hallertauer Tradition >

| Name of Ingredients | Shape | Content Based on 1 mg of α-Acid |
|---|---|---|
| Linalool | Bracts | 2.4 (μg) |
|  | Pellets Type 90 | 0.7 (μg) |
| T-PP | Bracts | 13.8 (mg) |
|  | Pellets Type 90 | 0.7 (mg) |
| PAO | Bracts | 1.4 (mg) |
|  | Pellets Type 90 | 0.15 (mg) |

TABLE 6

| Name of Varieties | Name of Ingredient | Shape | Content Based on 1 mg of α-Acid |
|---|---|---|---|
| Hersbrucker | Linalool | Bracts | 4.6 (μg) |
|  | T-PP | Bracts | 9.6 (mg) |
|  | PAO | Bracts | 1.1 (mg) |
| Perle | Linalool | Bracts | 0.9 (μg) |
|  | T-PP | Bracts | 10.1 (mg) |
|  | PAO | Bracts | 0.9 (mg) |
| Magnum | Linalool | Bracts | 1.2 (μg) |
|  | T-PP | Bracts | 4.1 (mg) |
|  | PAO | Bracts | 0.16 (mg) |

It was found from Table 5 and FIG. 5 that in all of linalool, which is a hoppy aroma ingredient, and T-PP and PAO, which are body ingredients, the hop bracts had markedly larger contents based on the α-acid, than Pellets Type 90. It was suggested from the above that the hop bracts can be useful in adjusting aroma and body of the beer-taste beverage. In addition, while it is seen from Table 6 that the variance in each of hop varieties is present, it could be seen that the contents of all of linalool, T-PP, and PAO based on the α-acid were larger in the bracts than the pellets, when compared with the data of pellets of Table 5 and FIG. 5.

Test Example 6

Sensory Evaluation for Beer

<Production of Beer>

One-hundred liters of a filtered wort, obtained by a conventional method, was heated to 100° C. with a boiling pot, and subjected to a boiling step. At that time, commercially available Pellets Type 90 (variety: Hallertauer Tradition) were added at the beginning of boiling in an amount corresponding to 10% by weight of the entire amount of the hops added, and hop bract pellets (variety: Hallertauer Tradition) were added at the beginning of boiling or at the end of boiling in an amount corresponding to 90% by weight of the entire amount of the hops added. After the end of boiling, a wort pool rest was taken, and rapidly cooled, to prepare a cold wort. Next, an yeast was added to allow fermentation, the fermented mixture was filtered, and a pressure of carbon dioxide gas was then adjusted to produce a beer. As the control, Pellets Type 90 (variety: Hallertauer Tradition) added in an entire amount at the beginning of boiling were used. Here, as the hop bract pellets, one obtained by pelletizing a by-product obtained during the production of Type 45 was used.

<Ingredient Analysis>

Figure 10:
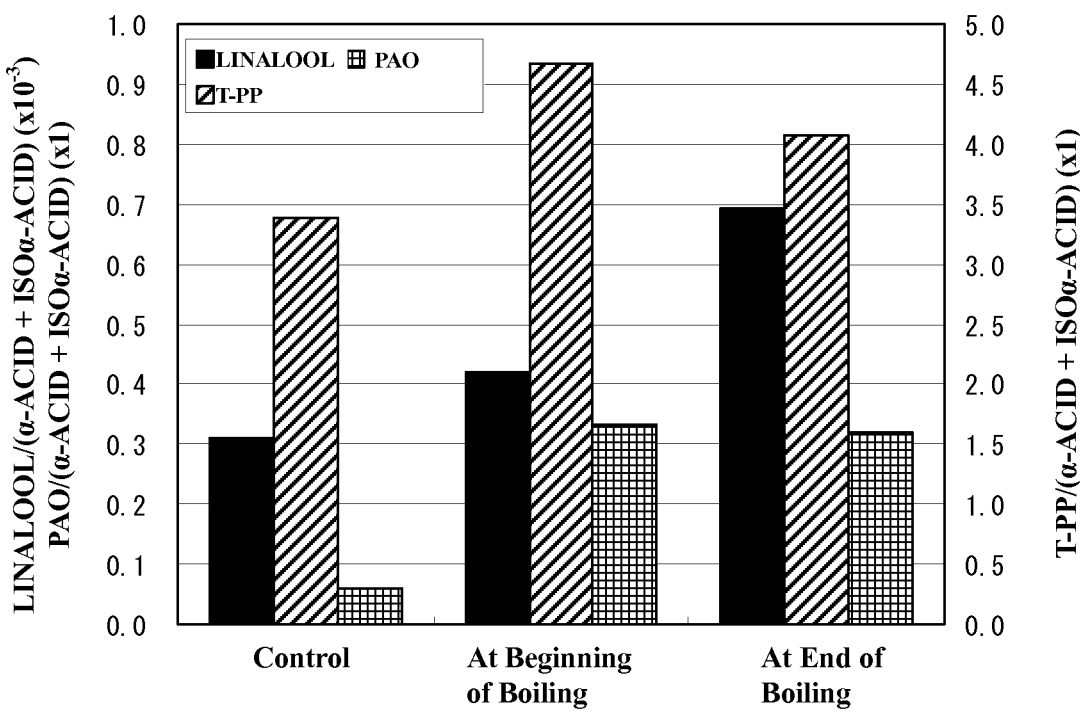
FIG. 10 is a graph showing the results of comparing the contents of each ingredient in the beers of Examples.

As to the beer produced, bitterness ingredient analysis, hoppy aroma ingredient analysis (linalool), and polyphenol analyses (T-PP, PAO) were carried out in accordance with Test Examples 1 to 4. The results of quantifying each ingredient are shown in Table 7 and FIGS. 6 to 9, and the results of a content ratio of each ingredient when a total content of α-acid and isoα-acid is defined as 1 are shown in Table 7 and FIG. 10, respectively. Here, the bitterness ingredient is expressed as a total content of α-acid and isoα-acid obtained by isomerizing α-acid.

<Sensory Evaluation>

Figure 11:
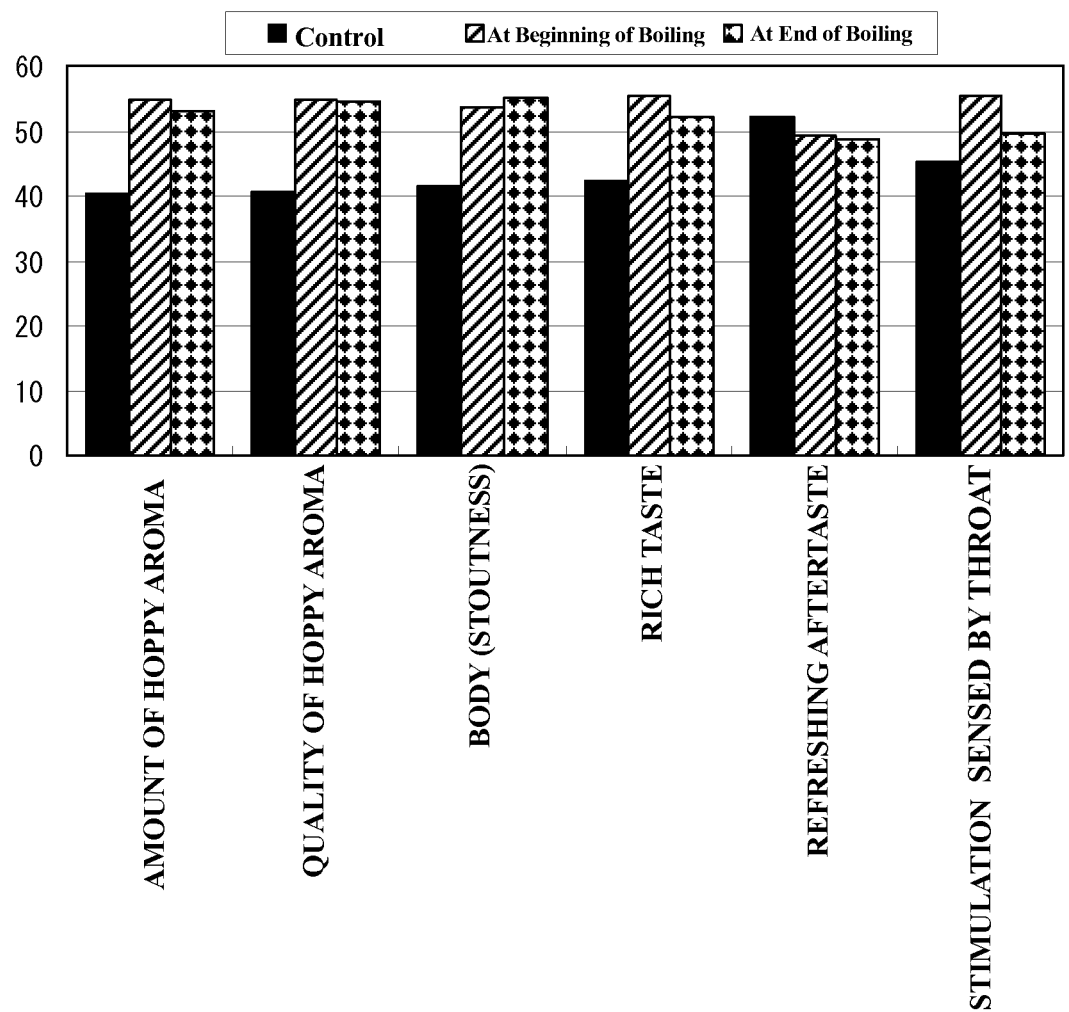
FIG. 11 are graphs showing the results of sensory evaluations for the beers of Examples.

As to the produced beer, sensory evaluation was made by 15 trained panelists. The items of sensory evaluation include a total of 6 items of amount of hoppy aroma, quality of hoppy aroma, body (stoutness), rich taste, refreshing aftertaste, and stimulation sensed by throat, and were subjected to score comparative evaluation from scores 0 to 3, to a first decimal place (0.1). Since the sensory score ranges differ depending upon the panelists, scores were normalized such that a mean of the scores of all the samples of one panelist was 50 and that a standard deviation was 10, and comparisons between the samples were made. The results are shown in FIG. 11.

TABLE 7

|  | Name of Ingredient | Content | Ratio with Total Content of α-Acid and Isoα-Acid |
| --- | --- | --- | --- |
| Control | α-Acid + Isoα-Acid | 17.4 (ppm) | 1 |
|  | Linalool | 5.4 (ppb) | 0.31 × 10⁻³ |

TABLE 7-continued

|  | Name of Ingredient | Content | Ratio with Total Content of α-Acid and Isoα-Acid |
| --- | --- | --- | --- |
|  | T-PP | 58.8 (ppm) | 3.4 |
|  | PAO | 1.0 (ppm) | 0.06 |
| At the Beginning of Boiling | α-Acid + Isoα-Acid | 19.2 (ppm) | 1 |
|  | Linalool | 8.0 (ppb) | 0.42 × 10⁻³ |
|  | T-PP | 89.7 (ppm) | 4.7 |
|  | PAO | 6.4 (ppm) | 0.33 |
| At the End of Boiling | α-Acid + Isoα-Acid | 18.2 (ppm) | 1 |
|  | Linalool | 12.6 (ppb) | 0.69 × 10⁻³ |
|  | T-PP | 74.1 (ppm) | 4.1 |
|  | PAO | 5.8 (ppm) | 0.32 |

It was evident from FIGS. 6 to 11 that taste and aroma can be enhanced by adding hop bracts. Especially, it was evident that by adding the hop bracts at the beginning of boiling, the taste ingredient can be more effectively given, and that by adding the hop bracts at the end of boiling, the aroma ingredient can be more effectively given.

INDUSTRIAL APPLICABILITY

According to the present invention, by the use of the hop bracts, it is possible to realize a balance between the bitterness, aroma derived from hops, and taste that cannot be achieved by a conventional production method. By appropriately adjusting the timing of adding hop bracts, beer-taste beverages having preferred features and strength of the aroma and controlled taste can be provided.

The invention claimed is:

1. A method for producing a beer-taste beverage, characterized in that the method comprises adding a hop bract-containing composition having an α-acid content of less than 1% by weight and greater than 0% by weight of the composition in the step of producing a beer-taste beverage,
    wherein the hop bract-containing composition is obtained by removing lupulin from hop flowers,
    wherein the hop bract-containing composition further comprises linalool in an amount of 0.12 parts by weight or more, and further comprises
    a total polyphenol in an amount of 410 parts by weight or more, or
    a dimeric proanthocyanidin and a trimeric proanthocyanidin in a total amount of 16 parts by weight or more,
    based on 100 parts by weight of the α-acid.

2. The method according to claim 1, wherein the hop bract-containing composition is hop pellets.

3. The method according to claim 1, wherein the hop bract-containing composition is added at a first half of a boiling step.

4. The method according to claim 1, wherein the hop bract-containing composition is added at a second half of a boiling step and/or steps subsequent to the boiling step.

5. The method according to claim 1, further comprising a fermentation step.

6. The method according to claim 1, wherein the hop bract-containing composition includes Hallertauer Tradition hops.

7. A beer-taste beverage produced by a method as defined in claim 1
    the method comprising adding a hop bract-containing composition having an α-acid content of less than 1% by weight and greater than 0% by weight of the composition in the step of producing a beer-taste beverage, wherein the hop bract-containing composition is obtained by removing lupulin from hop flowers, wherein the hop bract-containing composition further comprises linalool in an amount of 0.12 parts by weight or more, and further comprises a total polyphenol in an amount of 410 parts by weight or more, or a dimeric proanthocyanidin and a trimeric proanthocyanidin in a total amount of 16 parts by weight or more, based on 100 parts by weight of the α-acid.

* * * * *